US006584203B2

(12) United States Patent
Elko et al.

(10) Patent No.: US 6,584,203 B2
(45) Date of Patent: Jun. 24, 2003

(54) SECOND-ORDER ADAPTIVE DIFFERENTIAL MICROPHONE ARRAY

(75) Inventors: Gary W. Elko, Summit, NJ (US); Heinz Teutsch, Nuremberg (DE)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/999,298

(22) Filed: Oct. 30, 2001

(65) Prior Publication Data

US 2003/0031328 A1 Feb. 13, 2003

Related U.S. Application Data

(60) Provisional application No. 60/306,271, filed on Jul. 18, 2001.

(51) Int. Cl.[7] .................... H04R 3/00; H04R 5/00; H04B 15/00

(52) U.S. Cl. .................... 381/92; 381/94.6; 381/26

(58) Field of Search .................... 381/92, 94.6, 26

(56) References Cited

U.S. PATENT DOCUMENTS

| | | | | |
|---|---|---|---|---|
| 4,006,310 A | * | 2/1977 | Bayer | 379/167.14 |
| 5,473,701 A | * | 12/1995 | Cezanne et al. | 381/92 |
| 5,586,191 A | | 12/1996 | Elko et al. | 381/92 |
| 5,740,256 A | * | 4/1998 | Castello Da Costa et al. | 381/94.7 |

* cited by examiner

*Primary Examiner*—Forester W. Isen
*Assistant Examiner*—Elizabeth McChesney
(74) *Attorney, Agent, or Firm*—Steve Mendelsohn

(57) ABSTRACT

A second-order adaptive differential microphone array (ADMA) has two first-order elements (e.g., 802 and 804 of FIG. 8), each configured to convert a received audio signal into an electrical signal. The ADMA also has (i) two delay nodes (e.g., 806 and 808) configured to delay the electrical signals from the first-order elements and (ii) two subtraction nodes (e.g., 810 and 812) configured to generate forward-facing and backward-facing cardioid signals based on differences between the electrical signals and the delayed electrical signals. The ADMA also has (i) an amplifier (e.g., 814) configured to amplify the backward-facing cardioid signal by a gain parameter; (ii) a third subtraction node (e.g., 816) configured to generate a difference signal based on a difference between the forward-facing cardioid signal and the amplified backward-facing cardioid signal; and (iii) a lowpass filter (e.g., 818) configured to filter the difference signal from the third subtraction node to generate the output signal for the second-order ADMA. The gain parameter for the amplifier can be adaptively adjusted to move a null in the back half plane of the ADMA to track a moving noise source. In a subband implementation, a different gain parameter can be adaptively adjusted to move a different null in the back half plane to track a different moving noise source for each different frequency subband.

22 Claims, 12 Drawing Sheets

SECOND-ORDER ADAPTIVE DIFFERENTIAL MICROPHONE ARRAY

CROSS-REFERENCE TO RELATED APPLICATIONS

This application claims the benefit of the filing date of U.S. provisional application No. 60/306,271, filed on Jul. 18, 2001.

BACKGROUND OF THE INVENTION

1. Field of the Invention

The present invention relates to microphone arrays that employ directionality characteristics to differentiate between sources of noise and desired sound sources.

2. Description of the Related Art

The presence of background noise accompanying all kinds of acoustic signal transmission is a ubiquitous problem. Speech signals especially suffer from incident background noise, which can make conversations in adverse acoustic environments virtually impossible without applying appropriately designed electroacoustic transducers and sophisticated signal processing. The utilization of conventional directional microphones with fixed directivity is a limited solution to this problem, because the undesired noise is often not fixed to a certain angle.

SUMMARY OF THE INVENTION

Embodiments of the present invention are directed to adaptive differential microphone arrays (ADMAs) that are able to adaptively track and attenuate possibly moving noise sources that are located in the back half plane of the array. This noise attenuation is achieved by adaptively placing a null into the noise source's direction of arrival. Such embodiments take advantage of the adaptive noise cancellation capabilities of differential microphone arrays in combination with digital signal processing. Whenever undesired noise sources are spatially non-stationary, conventional directional microphone technology has its limits in terms of interference suppression. Adaptive differential microphone arrays (ADMAs) with their null-steering capabilities promise better performance.

In one embodiment, the present invention is a second-order adaptive differential microphone array (ADMA), comprising (a) a first first-order element (e.g., 802 of FIG. 8) configured to convert a received audio signal into a first electrical signal; (b) a second first-order element (e.g., 804 of FIG. 8) configured to convert the received audio signal into a second electrical signal; (c) a first delay node (e.g., 806 of FIG. 8) configured to delay the first electrical signal from the first first-order element to generate a delayed first electrical signal; (d) a second delay node (e.g., 808 of FIG. 8) configured to delay the second electrical signal from the second first-order element to generate a delayed second electrical signal; (e) a first subtraction node (e.g., 810 of FIG. 8) configured to generate a forward-facing cardioid signal based on a difference between the first electrical signal and the delayed second electrical signal; (f) a second subtraction node (e.g., 812 of FIG. 8) configured to generate a backward-facing cardioid signal based on a difference between the second electrical signal and the delayed first electrical signal; (g) an amplifier (e.g., 814 of FIG. 8) configured to amplify the backward-facing cardioid signal by a gain parameter to generate an amplified backward-facing cardioid signal; and (h) a third subtraction node (e.g., 816 of FIG. 8) configured to generate a difference signal based on a difference between the forward-facing cardioid signal and the amplified backward-facing cardioid signal.

In another embodiment, the present invention is an apparatus for processing signals generated by a microphone array (ADMA) having (i) a first first-order element (e.g., 802 of FIG. 8) configured to convert a received audio signal into a first electrical signal and (ii) a second first-order element (e.g., 804 of FIG. 8) configured to convert the received audio signal into a second electrical signal, the apparatus comprising (a) a first delay node (e.g., 806 of FIG. 8) configured to delay the first electrical signal from the first first-order element to generate a delayed first electrical signal; (b) a second delay node (e.g., 808 of FIG. 8) configured to delay the second electrical signal from the second first-order element to generate a delayed second electrical signal; (c) a first subtraction node (e.g., 810 of FIG. 8) configured to generate a forward-facing cardioid signal based on a difference between the first electrical signal and the delayed second electrical signal; (d) a second subtraction node (e.g., 812 of FIG. 8) configured to generate a backward-facing cardioid signal based on a difference between the second electrical signal and the delayed first electrical signal; (e) an amplifier (e.g., 814 of FIG. 8) configured to amplify the backward-facing cardioid signal by a gain parameter to generate an amplified backward-facing cardioid signal; and (g) a third subtraction node (e.g., 816 of FIG. 8) configured to generate a difference signal based on a difference between the forward-facing cardioid signal and the amplified backward-facing cardioid signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

First-Order Fullband ADMA

Figure 1:
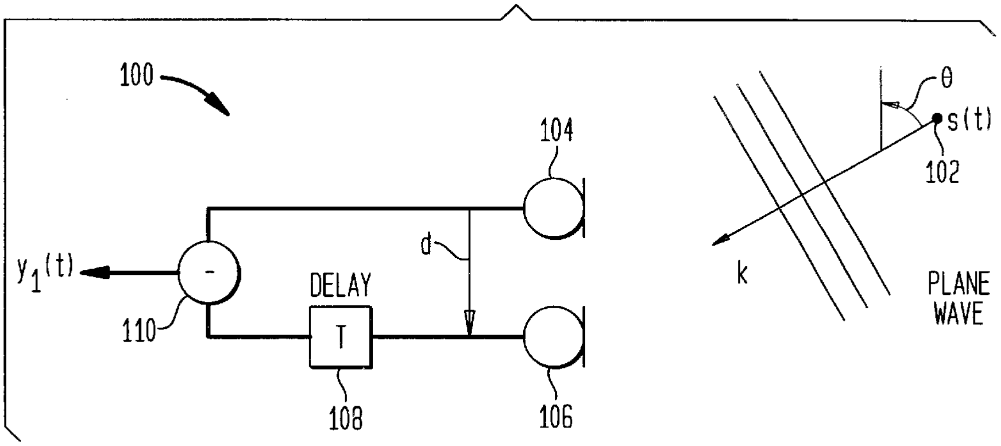
FIG. 1 shows a schematic representation of a first-order adaptive differential microphone array (ADMA) receiving an audio signal from a signal source at a distance where farfield conditions are applicable.

FIG. 1 shows a schematic representation of a first-order adaptive differential microphone array (ADMA) 100 receiving audio signal s(t) from audio source 102 at a distance where farfield conditions are applicable. When farfield conditions apply, the audio signal arriving at ADMA 100 can be treated as a plane wave. ADMA 100 comprises two zeroth-order microphones 104 and 106 separated by a distance d . Electrical signals generated by microphone 106 are delayed by inter-element delay T at delay node 108 before being subtracted from the electrical signals generated by microphone 104 at subtraction node 110 to generate the ADMA output y(t). The magnitude of the frequency and angular dependent response $H_1(f, \theta)$ of first-order ADMA 100 for a signal point source at a distance where farfield conditions are applicable can be written according to Equation (1) as follows:

$$|H_1(f,\theta)| = \left|\frac{Y_1(f,\theta)}{S(f)}\right| = 1 - e^{-j(2\pi fT + k\cdot d)} = 2\sin\frac{2\pi f[T + (d\cos\theta)/c]}{2} \tag{1}$$

where $Y_1(f, \theta)$ is the spectrum of the ADMA output signal y(t), S(f) is the spectrum of the signal source, k is the sound vector, $|k|=k=2\pi f/c$ is the wavenumber, c is the speed of sound, and d is the displacement vector between microphones 104 and 106. As indicated by the term $Y_1(f, \theta)$, the ADMA output signal is dependent on the angle θ between the displacement vector d and the sound vector k as well as on the frequency f of the audio signal s(t).

For small element spacing and short inter-element delay ($kd \ll \pi$ and $T \ll \frac{1}{2}f$, Equation (1) can be approximated according to Equation (2) as follows:

$$|H_1(f,\theta)| \approx 2\pi f[T + (d\cos\theta)/c]. \tag{2}$$

As can be seen, the right side of Equation (2) consists of a monopole term and a dipole term (cosθ). Note that the amplitude response of the first-order differential array rises linearly with frequency. This frequency dependence can be corrected for by applying a first-order lowpass filter at the array output. The directivity response can then be expressed by Equation (3) as follows:

$$D_1(\theta) = \frac{T}{T + d/c} + \left(1 - \frac{T}{T + d/c}\right)\cos\theta. \tag{3}$$

Figure 2:
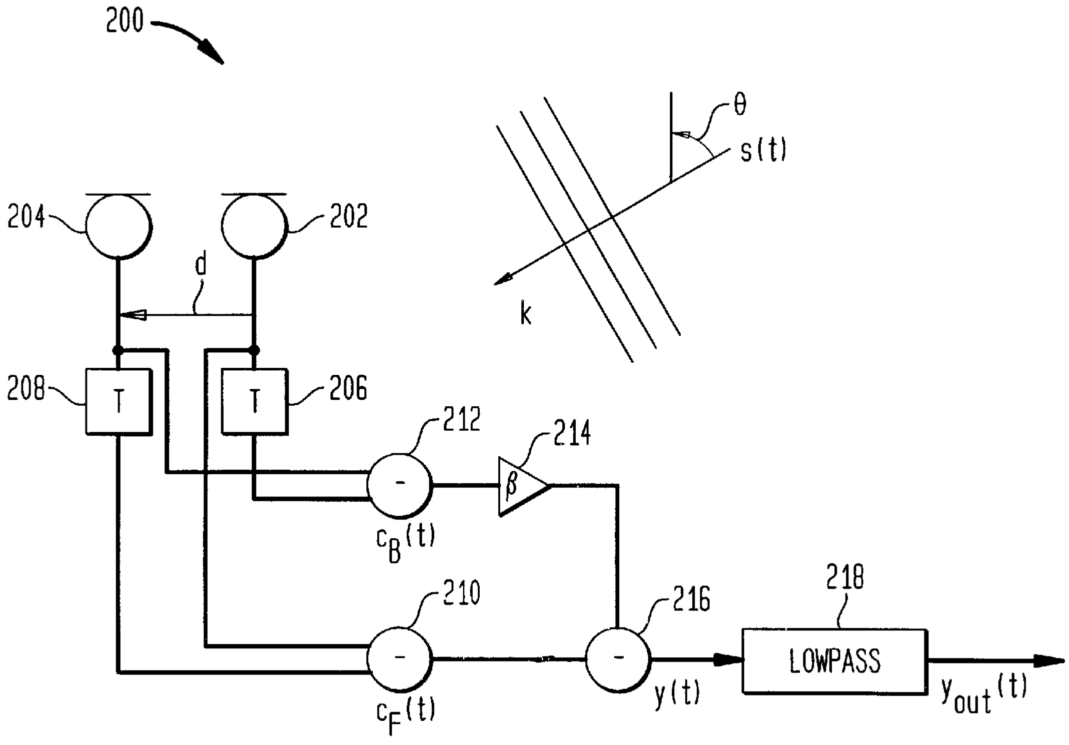
FIG. 2 shows a schematic diagram of a first-order fullband ADMA based on an adaptive back-to-back cardioid system.

Since the location of the source 102 is not typically known, an implementation of a first-order ADMA based on Equation (3) would need to involve the ability to generate any time delay T between the two microphones. As such, this approach is not suitable for a real-time system. One way to avoid having to generate the delay T directly in order to obtain the desired directivity response is to utilize an adaptive back-to-back cardioid system FIG. 2 shows a schematic diagram of a first-order fullband ADMA 200 based on an adaptive back-to-back cardioid system. In ADMA 200, signals from both microphones 202 and 204 are delayed by a time delay T at delay nodes 206 and 208, respectively. The delayed signal from microphone 204 is subtracted from the undelayed signal from microphone 202 at forward subtraction node 210 to form the forward-facing cardioid signal $C_F(t)$. Similarly, the delayed signal from microphone 202 is subtracted from the undelayed signal from microphone 204 at backward subtraction node 212 to form the backward-facing cardioid signal $c_B(t)$, which is amplified by gain β at amplifier 214. The signal y(t) is generated at subtraction node 216 based on the difference between the forward and amplified backward signals. The signal y(t) is then lowpass filtered at filter 218 to generate the ADMA output signal $y_{out}(t)$.

Figure 3:
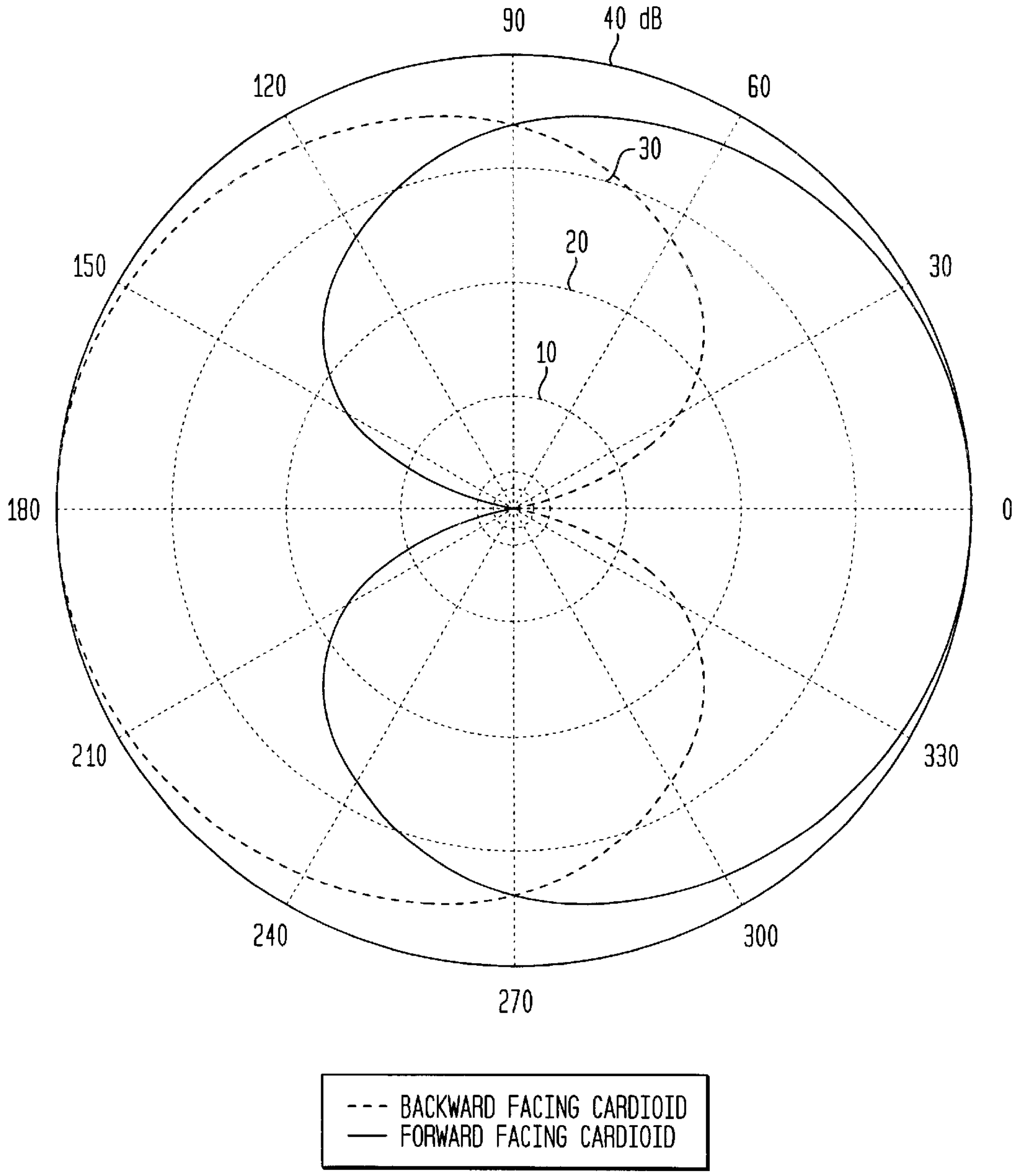
FIG. 3 shows the directivity pattern of the first-order ADMA of FIG. 2.

FIG. 3 shows the directivity pattern of the first-order back-to-back cardioid system of ADMA 200. ADMA 200 can be used to adaptively adjust the response of the backward facing cardioid in order to track a possibly moving noise source located in the back half plane. By choosing T=d/c, the back-to-back cardioid can be formed directly by appropriately subtracting the delayed microphone signals.

The transfer function $H_1(f, \theta)$ of first-order ADMA 200 can be written according to Equation (4) as follows:

$$H_1(f,\theta) = \frac{Y_{out}(f,\theta)}{S(f)} = 2je^{-j\pi fT}\left(\sin\frac{kd(1+\cos\theta)}{2} - \beta\sin\frac{kd(1-\cos\theta)}{2}\right). \tag{4}$$

where $Y_{out}(f, \theta)$ is the spectrum of the ADMA output signal $y_{out}(t)$.

Figure 4:
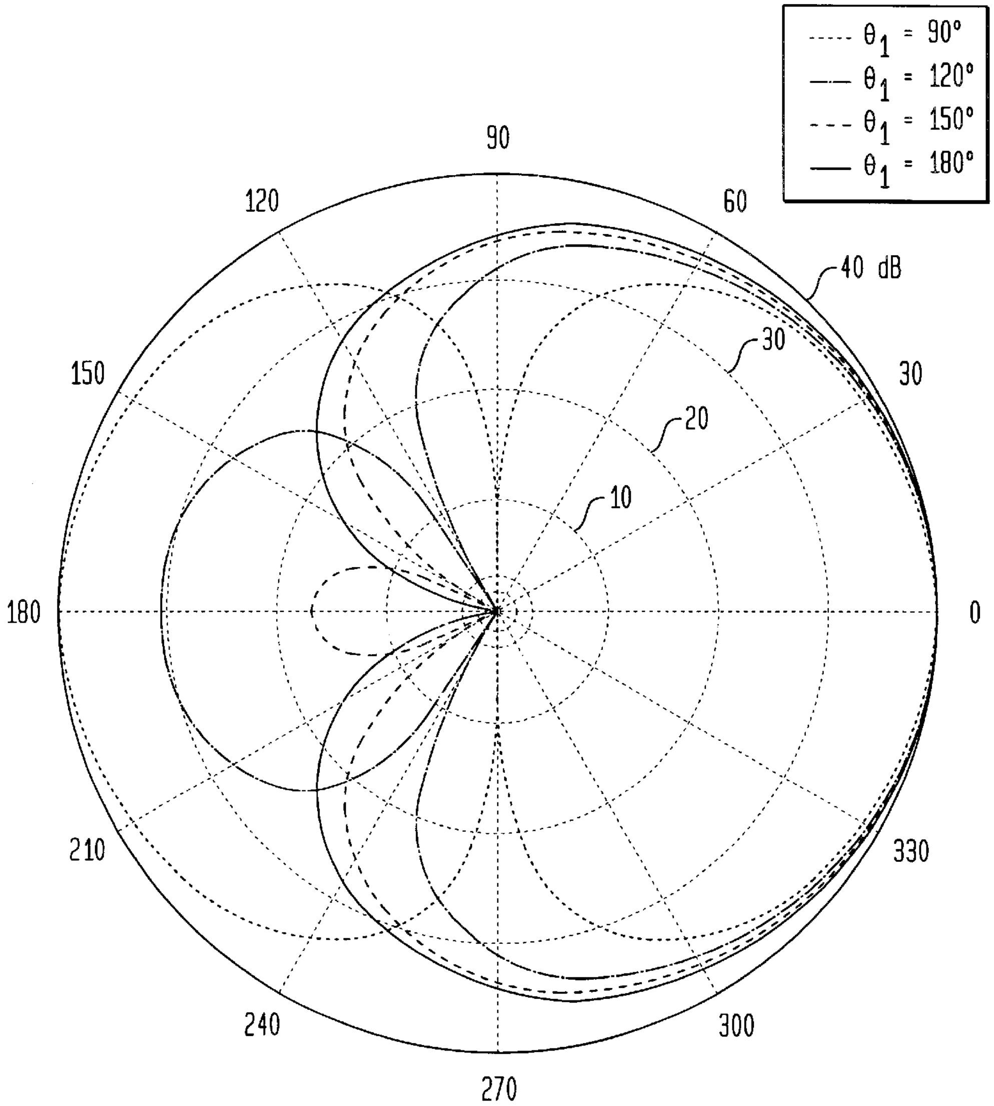
FIG. 4 shows directivity patterns that can be obtained by the first-order ADMA for $\theta_1$, values of 90°, 120°, 150°, and 180°.

The single independent null angle $\theta_1$ of first-order ADMA 200, which, for the present discussion, is assumed to be placed into the back half plane of the array ($90° \leqq \theta_1 \leqq 180°$), can be found by setting Equation (4) to zero and solving for $\theta=\theta_1$, which yields Equation (5) as follows:

$$\theta_1 = \arccos\left(\frac{2}{kd}\arctan\left(\frac{\beta-1}{\beta+1}\tan\frac{kd}{2}\right)\right), \tag{5}$$

which for small spacing and short delay can be approximated according to Equation (6) as follows:

$$\theta_1 \approx \arccos\frac{\beta-1}{\beta+1}, \tag{6}$$

where $0 \leqq \beta \leqq 1$ under the constraint ($90° \theta_1 \leqq 180°$). FIG. 4 shows the directivity patterns that can be obtained by first-order ADMA 200 for $\theta_1$ values of 90°, 120°, 150°, and 180°.

In a time-varying environment, an adaptive algorithm is preferably used in order to update the gain parameter β. In one implementation, a normalized least-mean-square (NLMS) adaptive algorithm may be utilized, which is computationally inexpensive, easy to implement, and offers reasonably fast tracking capabilities. One possible real-valued time-domain one-tap NLMS algorithm can be written according to Equation 2 (7a) and (7b) as follows:

$$y(i) = c_F(i) - \beta(i)c_B(i), \tag{7a}$$

$$\beta(i+1) = \beta(i) + \frac{\mu}{a + \|c_B(i)\|}c_B(i)y(i), \tag{7b}$$

where $c_F(i)$ and $c_B(i)$ are the values for the forward- and backward-facing cardioid signals at time instance i, μ is an adaptation constant where $0<\mu<2$, and α is a small constant where $\alpha>0$.

Further information on first-order adaptive differential microphone arrays is provided in U.S. Pat. No. 5,473,701 (Cezanne et al.), the teachings of which are incorporated herein by reference.

Second-Order Fullband ADMA

Figure 5:
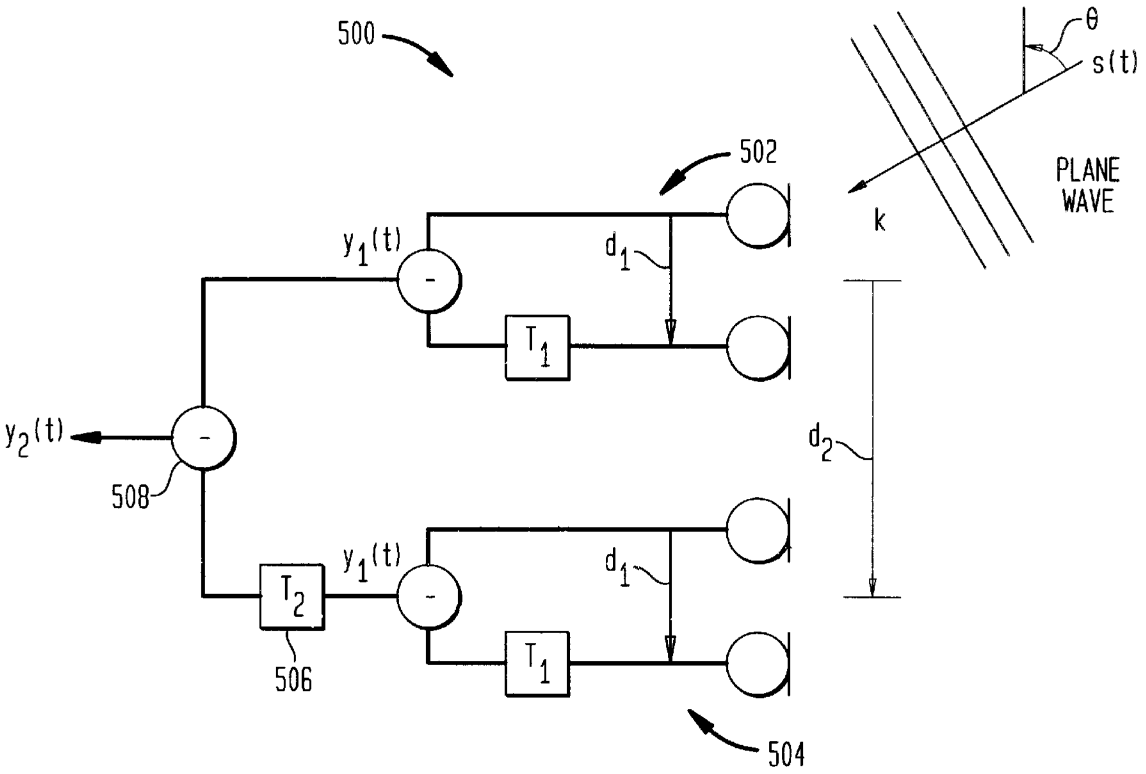
FIG. 5 shows a schematic diagram of a second-order fullband ADMA.

FIG. 5 shows a schematic diagram of a second-order fullband ADMA 500 comprising two first-order ADMAs 502 and 504, each of which is an instance of first-order ADMA 100 of FIG. 1 having an inter-element delay $T_1$. After delaying the signal from first-order array 504 by an additional time delay $T_2$ at delay node 506, the difference between the two first-order signals is generated at subtraction node 508 to generate the output signal $y_2(t)$ of ADMA 500.

When farfield conditions apply, the magnitude of the frequency and angular dependent response $H_2(f, \theta)$ of second-order ADMA 500 is given by Equation (8) as follows:

$$|H_2(f,\theta)| = \left|\frac{Y_2(f,\theta)}{S(f)}\right| = 4\prod_{v=1}^{2} \sin\frac{2\pi f[T_v + (d_v\cos\theta)/c]}{2}, \tag{8}$$

where $Y_2(f, \theta)$ is the spectrum of the ADMA output signal $y_2(t)$. For the special case of small spacing and delay, i.e., $kd_1$, $kd_2 \ll \pi$ and $T_1$, $T_2 \ll \frac{1}{2}f$, Equation (8) may be written as Equation (9) as follows:

$$\left|H_2(f,\theta)\right| \approx (2\pi f)^2 \prod_{v=1}^{2} [T_v + (d_v\cos\theta)/c]. \tag{9}$$

Analogous to the case of first-order differential array 200 of FIG. 2, the amplitude response of second-order array 500 consists of a monopole term, a dipole term (cos θ), and an additional quadrapole term ($\cos^2\theta$). Also, a quadratic rise as a function of frequency can be observed. This frequency dependence can be equalized by applying a second-order lowpass filter. The directivity response can then be expressed by Equation (10) as follows:

$$D_2(\theta) = \prod_{v=1}^{2}\left(\frac{T_v}{T_v + d_v/c} + \left(1 - \frac{T_v}{T_v + d_v/c}\right)\cos\theta\right), \tag{10}$$

which is a direct result of the pattern multiplication theorem in electroacoustics.

Figure 6:
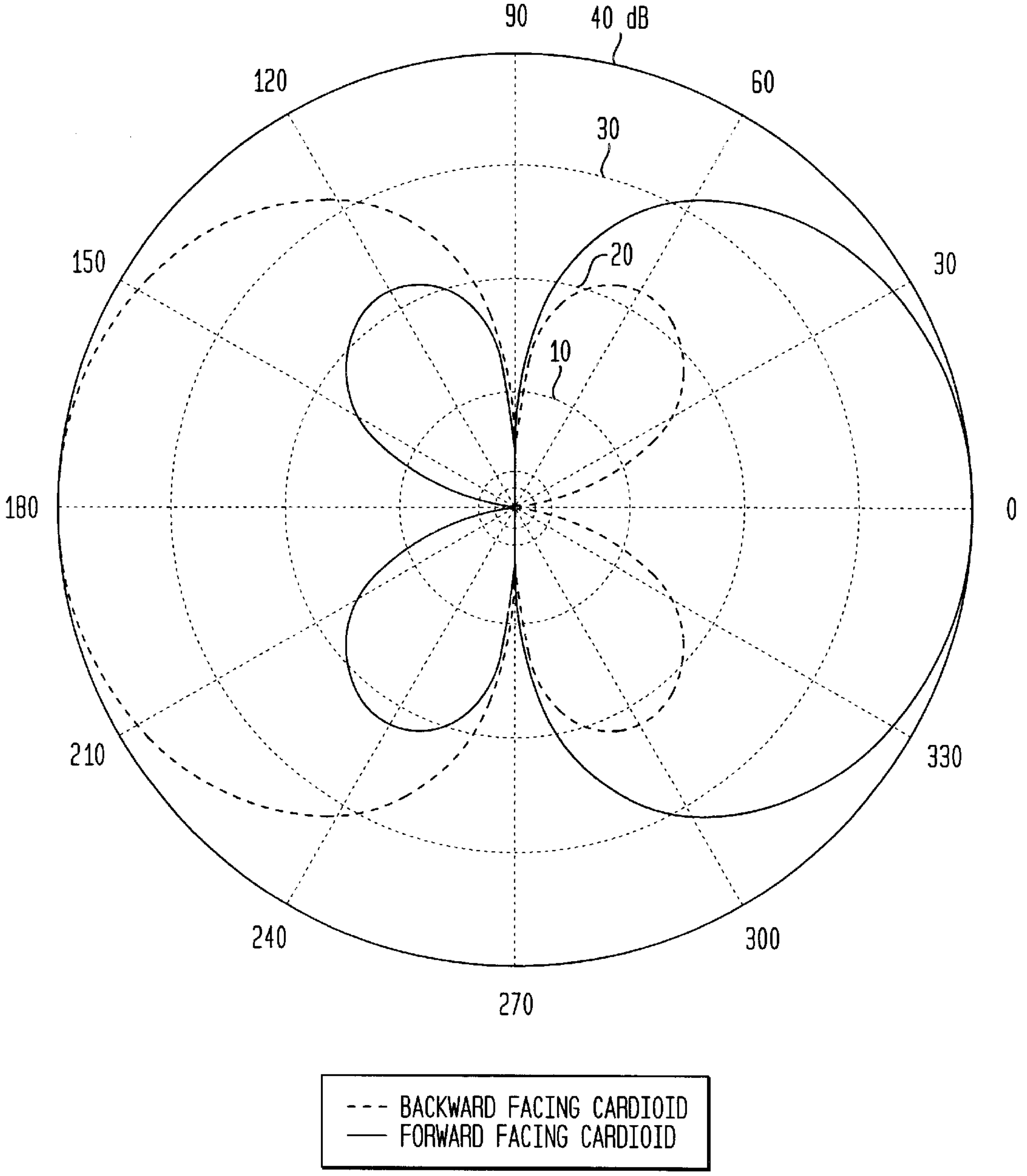
FIG. 6 shows the directivity pattern of a second-order back-to-back cardioid system.

One design goal of a second-order differential farfield array, such as ADMA 500 of FIG. 5, may be to use the array in a host-based environment without the need for any special purpose hardware, e.g., additional external DSP interface boards. Therefore, two dipole elements may be utilized in order to form the second-order array instead of four omnidirectional elements. As a consequence, $T_1 \equiv 0$ which means that one null angle is fixed to $\theta_{21}=90°$. In this case, although two independent nulls can be formed by the second-order differential array, only one can be made adaptive if two dipole elements are used instead of four omnidirectional transducers. The implementation of such a second-order ADMA may be based on first-order cardioid ADMA 200 of FIG. 2, where $d=d_2$, $T=T_2$, $\beta=\beta_2$, and $d_1$ is the acoustical dipole length of the dipole transducer. Additionally, the lowpass filter is chosen to be a second-order lowpass filter. FIG. 6 shows the directivity pattern of such a second-order back-to-back cardioid system. Those skilled in the art will understand that a second-order ADMA can also be implemented with three omnidirectional elements.

Figure 7:
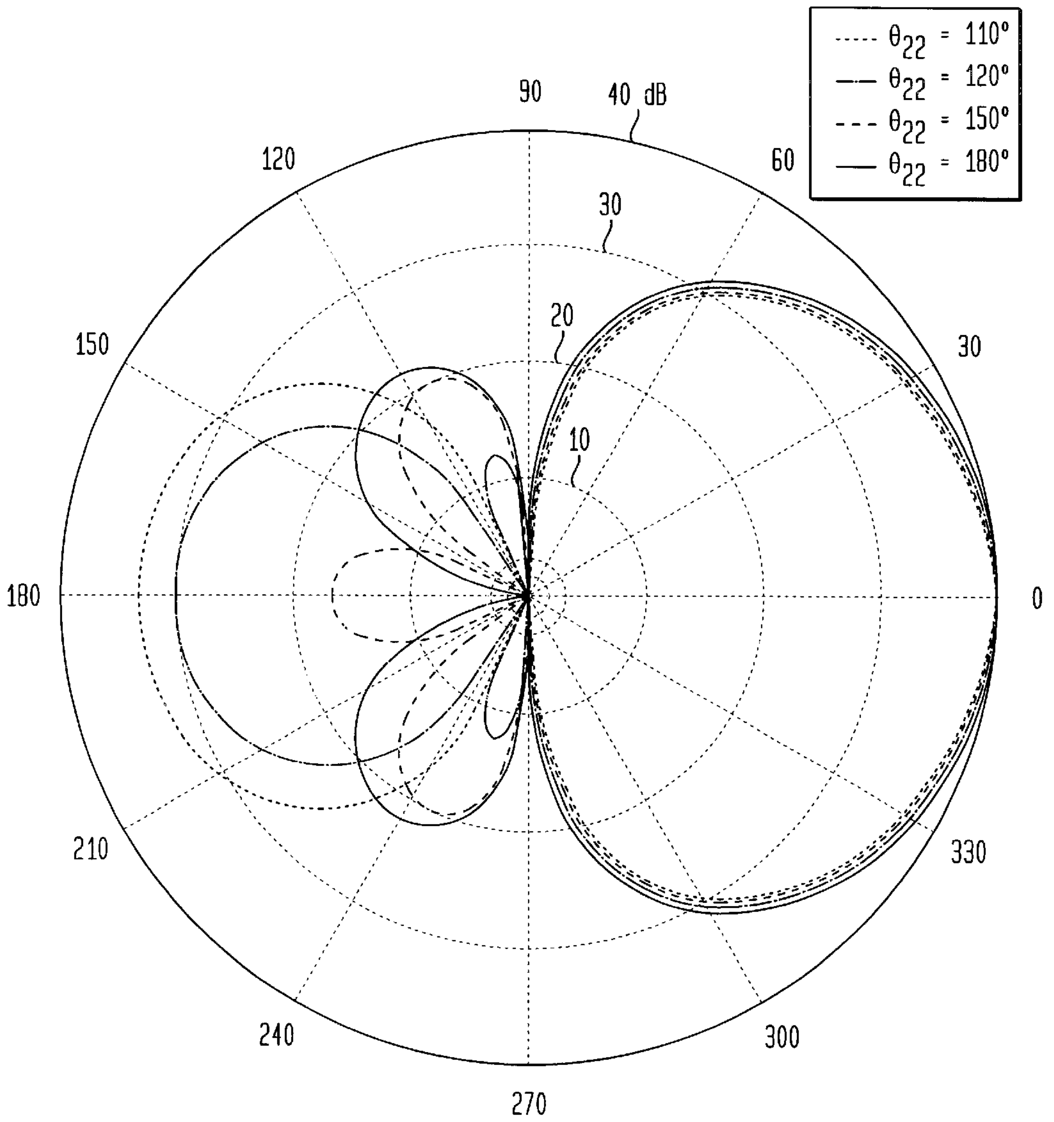
FIG. 7 shows the directivity patterns that can be obtained by a second-order ADMA formed from two dipole elements for $\theta_{22}$ values of 90°, 120°, 150°, and 180°.

The transfer function $H_2(f, \theta)$ of a second-order ADMA formed of two dipole elements can be written according to Equation (11) as follows:

$$H_2(f,\theta) = \frac{Y_{out}(f,\theta)}{S(f)} = -4e^{-j\pi f T_2}\sin\left(\frac{kd_1\cos\theta}{2}\right)\cdot\left(\sin\frac{kd_2(1+\cos\theta)}{2} - \beta_2\sin\frac{kd_2(1-\cos\theta)}{2}\right), \tag{11}$$

with null angles given by Equations (12a) and (12b) as follows:

$$\theta_{21}=90°, \tag{12a}$$

$$\theta_{22} \approx \arccos\frac{\beta_2 - 1}{\beta_2 + 1}, \tag{12b}$$

where $0 \leqq \beta_2 \leqq 1$ under the constraint $90° \leqq \beta_{22} 23\ 180°$. FIG. 7 shows the directivity patterns that can be obtained by a second-order ADMA formed from two dipole elements for $\theta_{22}$ values of 90°, 120°, 150°, and 180°.

As shown in Elko, G. W., "Superdirectional Microphone Arrays," *Acoustic Signal Processing for Telecommunication*, J. Benesty and S. L. Gay (eds.), pp. 181–236, Kluwer Academic Publishers, 2000, a second-order differential array is typically superior to a first-order differential array in terms of directivity index, front-to-back ratio, and beamwidth.

Subband ADMA

Figure 8:
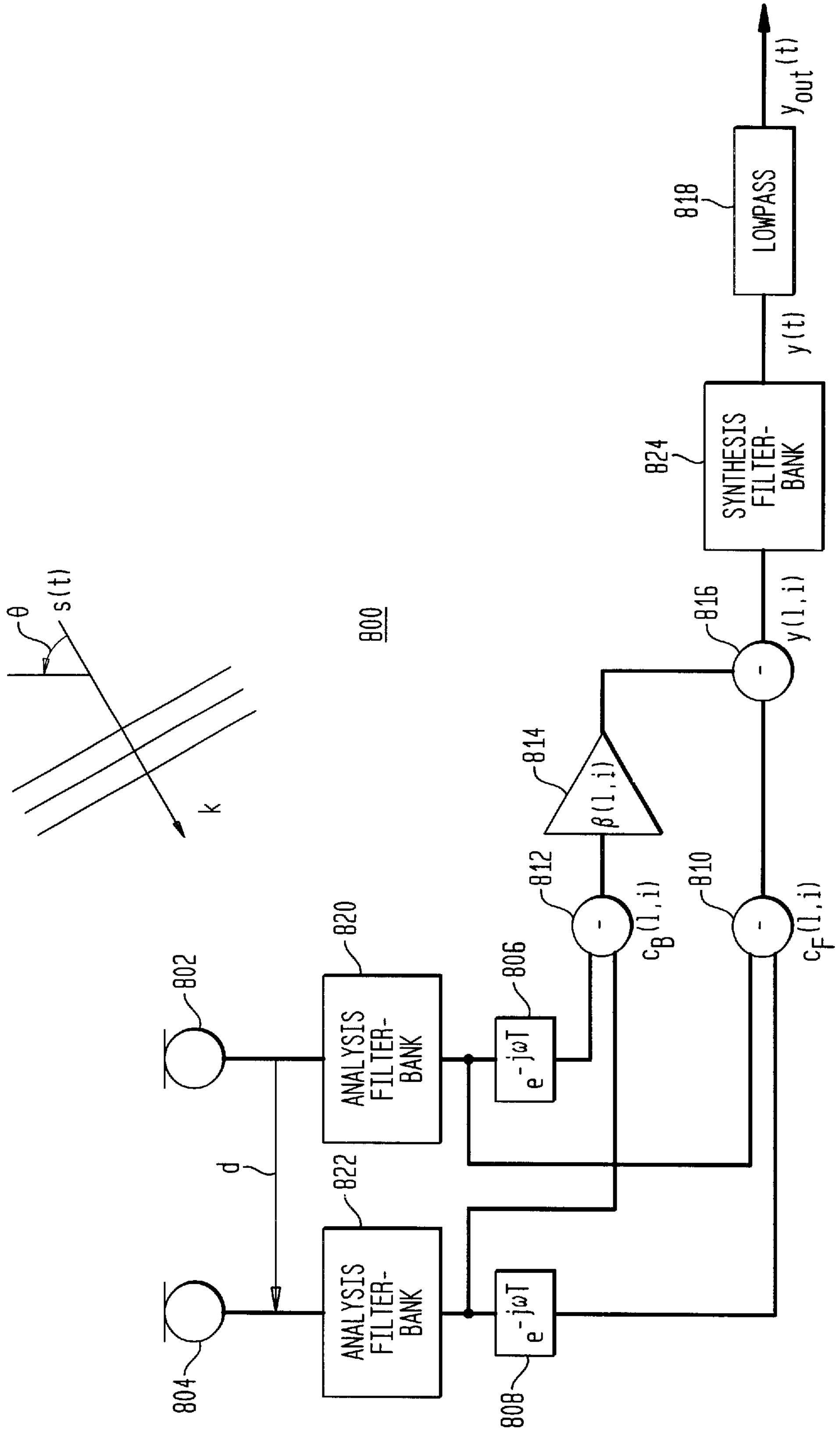
FIG. 8 shows a schematic diagram of a subband two-element ADMA.

FIG. 8 shows a schematic diagram of a subband two-element ADMA 800 comprising two elements 802 and 804. When elements 802 and 804 are omnidirectional elements, ADMA 800 is a first-order system; when elements 802 and 804 are dipole elements, ADMA 800 is a second-order system. ADMA 800 is analogous to fullband ADMA 200 of FIG. 2, except that one additional degree of freedom is obtained for ADMA 800 by performing the adaptive algorithm independently in different frequency subbands. In particular, delay nodes 806 and 808 of subband ADMA 800 are analogous to delay nodes 206 and 208 of fullband ADMA 200; subtraction nodes 810, 812, and 816 of ADMA 800 are analogous to subtraction nodes 210, 212, and 216 of ADMA 200; amplifier 814 of ADMA 800 is analogous to amplifier 214 of ADMA 200; and lowpass filter 818 of ADMA 800 is analogous to lowpass filter 218 of ADMA 200, except that, for ADMA 800, the processing is independent for different frequency subbands.

To provide subband processing, analysis filter banks 820 and 822 divide the electrical signals from elements 802 and 804, respectively, into two or more subbands l, and amplifier 814 can apply a different gain β(l,i) to each different subband l in the backward-facing cardioid signal $c_B(l,i)$. In addition, synthesis filter bank 824 combines the different subband signals y(l,i) generated at summation node 816 into a single fullband signal y(t), which is then lowpass filtered by filter 818 to generate the output signal $y_{out}(t)$ of ADMA 800.

The gain parameter β(l,i), where l denotes the subband bin and i is the discrete time instance, is preferably updated by an adaptive algorithm that minimizes the output power of the array. This update therefore effectively adjusts the response of the backward-facing cardioid $c_B(l,i)$ and can be written according to Equations (13a) and (13b) as follows;

$$y(l,i)=c_F(l,i)-\beta(l,i)c_B(l,i), \tag{13a}$$

$$\tilde{\beta}(l, i+1) = \beta(l, i) + \frac{\mu y(l, i) c_B(l, i)}{\|c_B(l, i)\|^2 + a}, \tag{13b}$$

where $$\beta(l, i) = \begin{cases} \tilde{\beta}(l, i), & 0 \le \tilde{\beta}(l, i) \le 1 \\ 0, & \tilde{\beta}(l, i) < 0 \\ 1, & \tilde{\beta}(l, i) > 1 \end{cases}, \tag{14}$$

and $\mu$ is the update parameter and $\alpha$ is a positive constant.

By using this algorithm, multiple spatially distinct noise sources with non-overlapping spectra located in the back half plane of the ADMA can be tracked and attenuated simultaneously.

Implementation and Measurements

PC-based real-time implementations running under the Microsoft™ Windows™ operating system were realized using a standard soundcard as the analog-to-digital converter. For these implementations, the demonstrator's analog front-end comprised two omnidirectional elements of the type Panasonic WM-54B as well as two dipole elements of the type Panasonic WM-55D103 and a microphone preamplifier offering 40-dB gain comprise the analog front-end. The implementations of the first-order ADMAs of FIGS. 2 and 8 utilized the two omnidirectional elements and the preamplifier, while the implementation of the second-order ADMA of FIG. 5 utilized the two dipole elements and the preamplifier.

The signals for the forward-facing cardioids $c_F(t)$ and the backward-facing cardioids $c_B(t)$ of the first-order ADMAs of FIGS. 2 and 8 were obtained by choosing the spacing d between the omnidirectional microphones such that there is one sample delay between the corresponding delayed and undelayed microphone signals. Similarly, the signals for the forward- and backward-facing cardioids of the second-order ADMA of FIG. 5 were obtained by choosing the spacing $d_2$ between the dipole microphones such that there is one sample delay between the corresponding delayed and undelayed microphone signals. Thus, for example, for a sampling frequency $f_s$ of 22050 Hz, the microphone spacing $d=d_2=$ 1.54 cm. For the Panasonic dipole elements, the acoustical dipole length $d_1$ was found to be 0.8 cm.

Figure 9A:
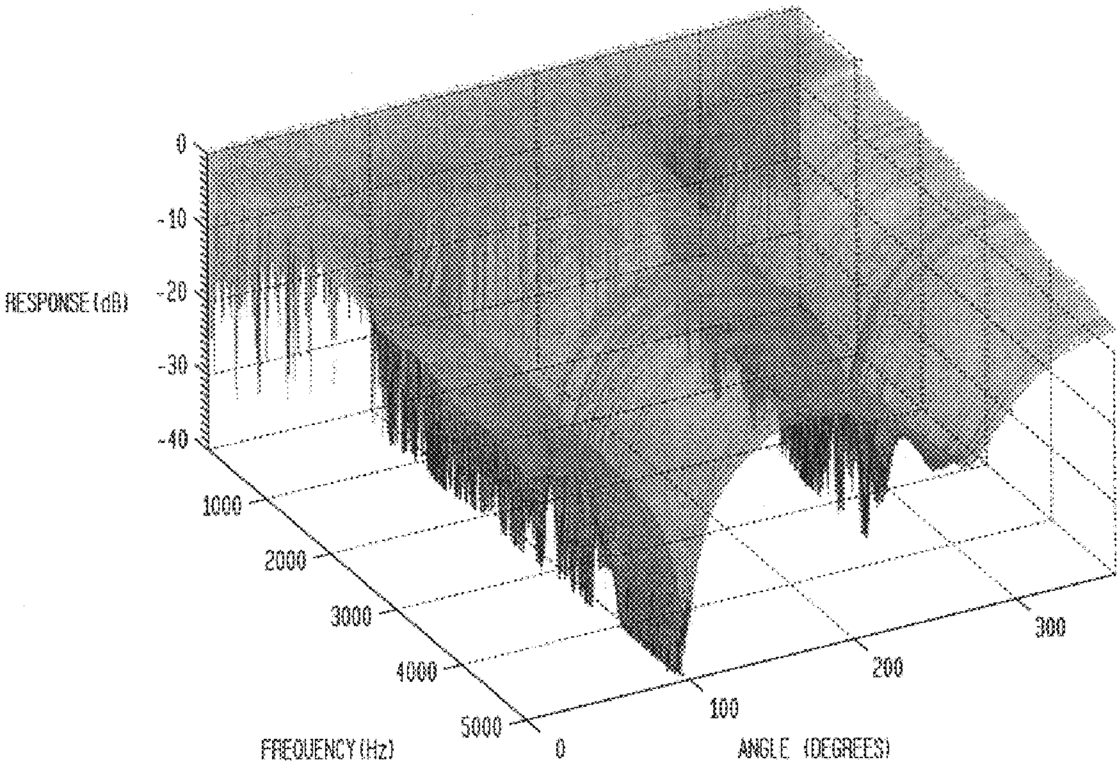
FIGS. 9A and 9B depict the fullband ADMA directivity patterns for first-order and second-order arrays, respectively.
Figure 9B:
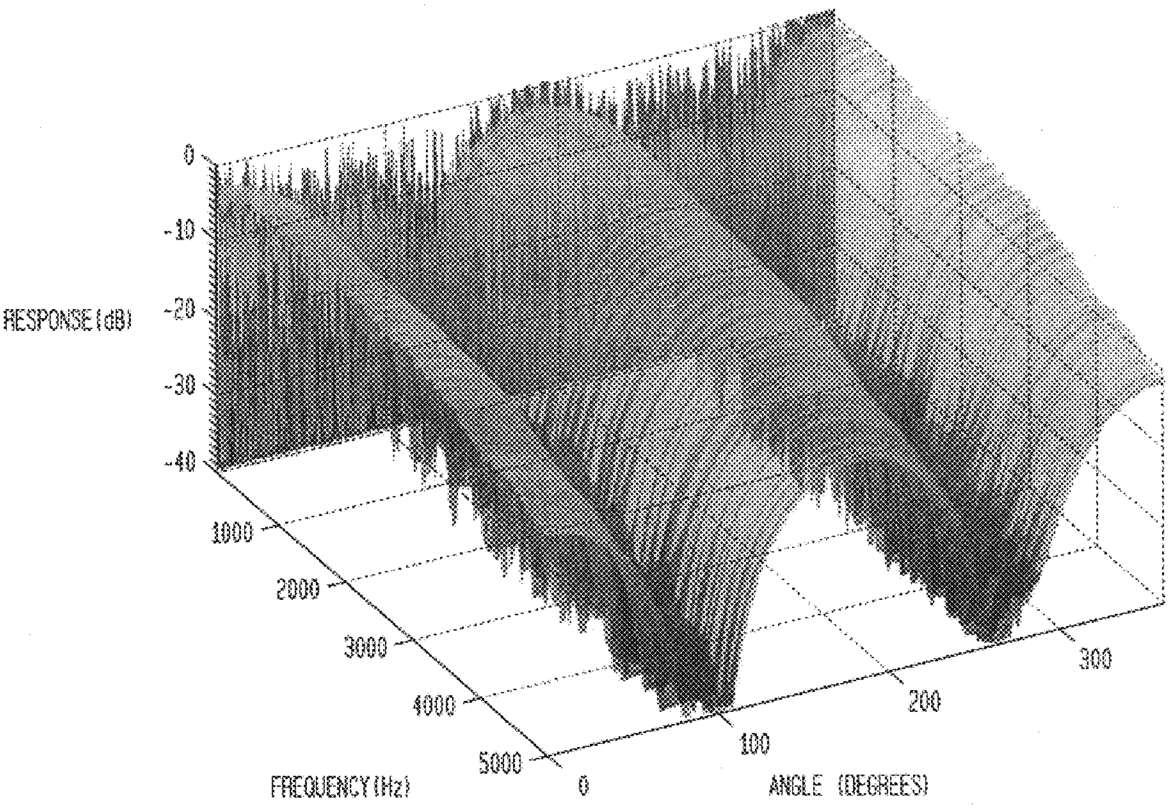

FIGS. 9A and 9B depict the fullband ADMA directivity patterns for first-order and second-order arrays, respectively. These measurements were performed by placing a broadband jammer (noise source) at approximately 90° with respect to the array's axis (i.e., $\theta_1$ for the first-order array and $\theta_{22}$ for the second-order array) utilizing a standard directivity measurement technique. It can be seen that deep nulls covering wide frequency ranges are formed in the direction of the jammer.

Figure 10:
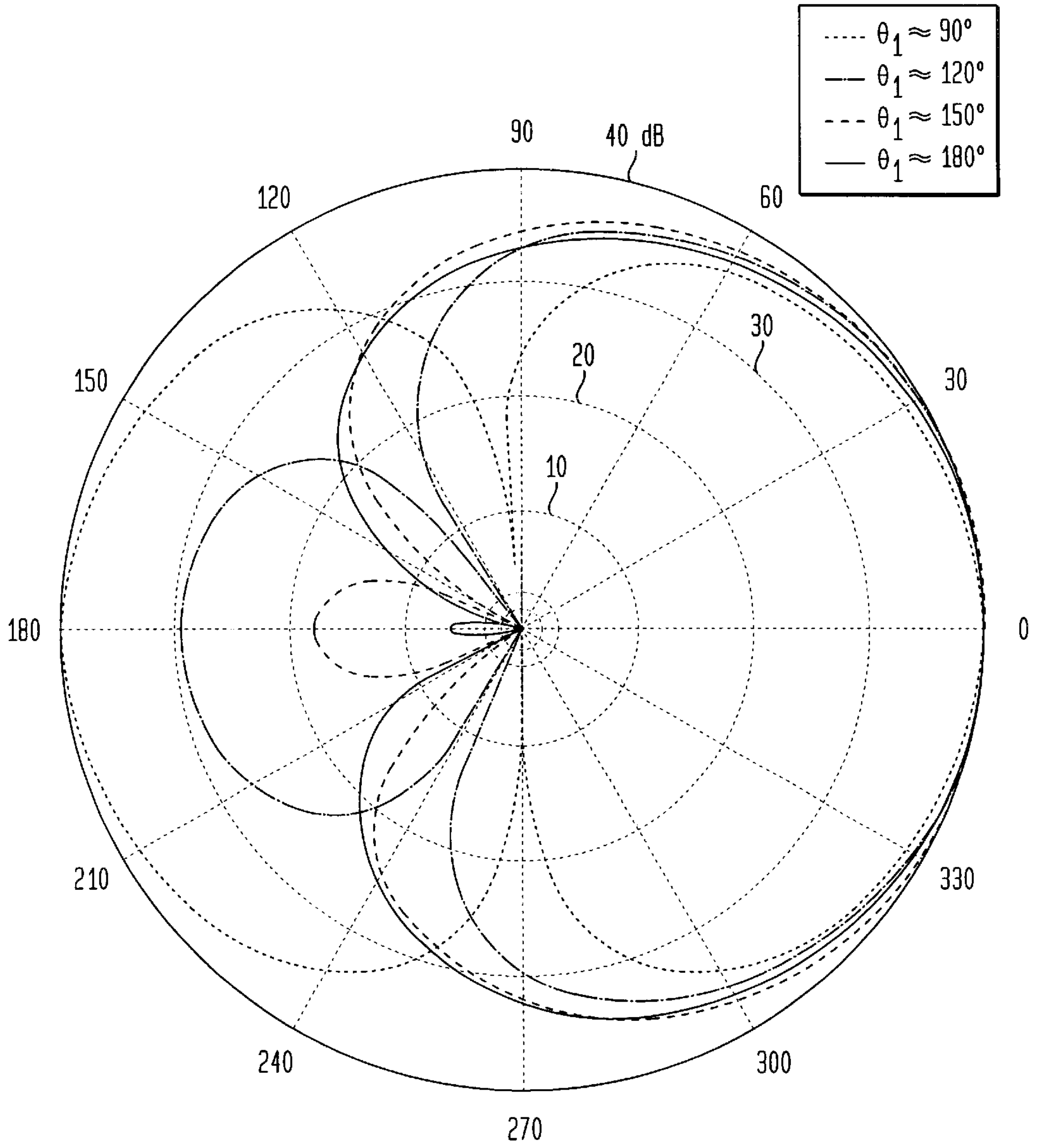
FIGS. 10 and 11 show measured directivity of first- and second-order subband implementations of the ADMA of FIG. 8, respectively, for four simultaneously playing sinusoids.
Figure 11:
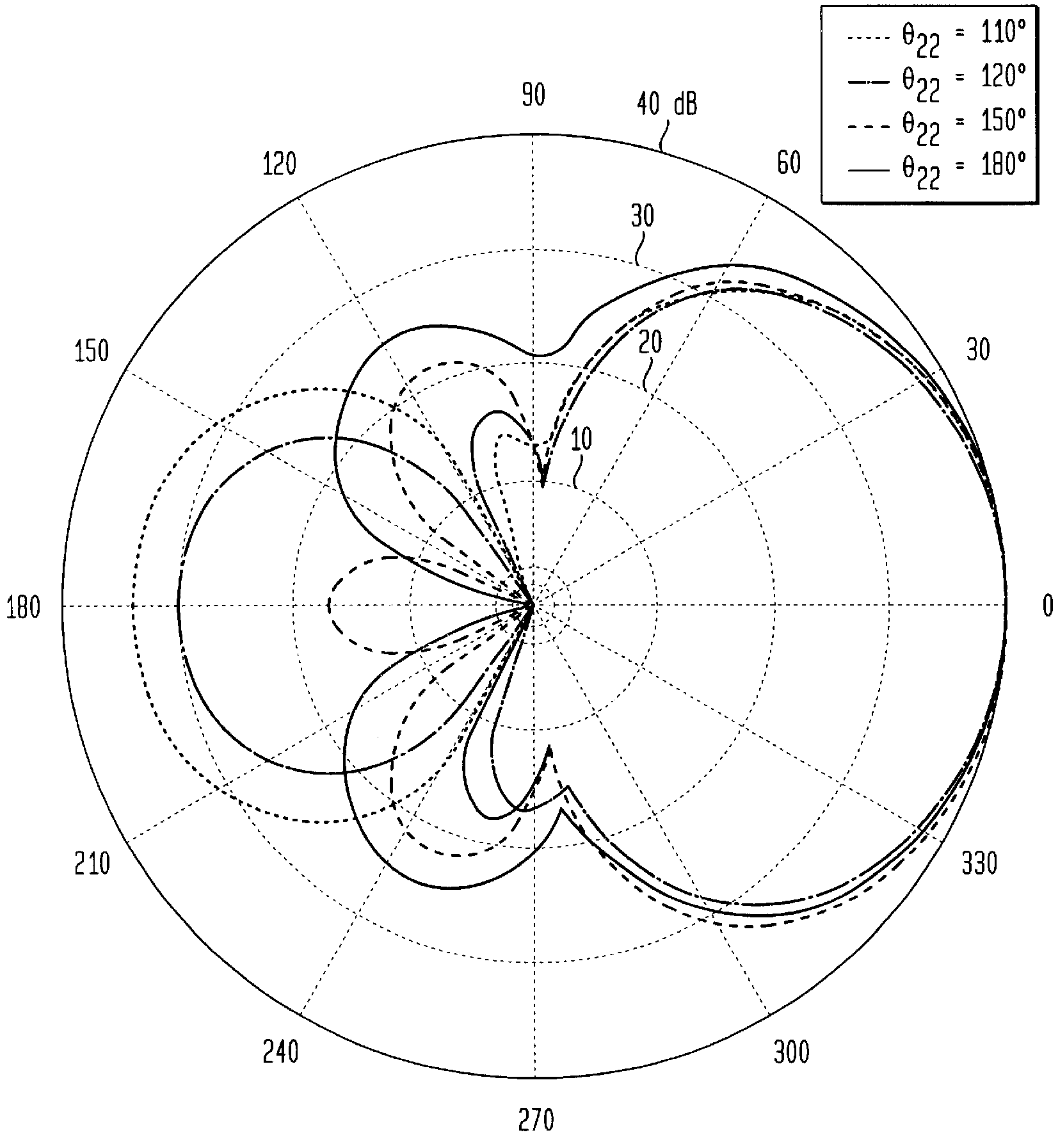

FIGS. 10 and 11 show measured directivity of first- and second-order subband implementations of ADMA 800 of FIG. 8, respectively, for four simultaneously playing sinusoids. For the first-order subband implementation, four loudspeakers simultaneously played sinusoidal signals while positioned in the back half plane of the arrays at $\theta_1$ values of approximately 90°, 120°, 150°, and 180°. For the second-order subband implementation, four loudspeakers simultaneously played sinusoidal signals while positioned in the back half plane of the arrays at $\theta_{22}$ values of approximately 110°, 120°, 150°, and 180°. As can be seen, these measurements are in close agreement with the simulated patterns shown in FIGS. 4 and 7.

In order to combat the noise amplification properties inherent in differential arrays, the demonstrator included a noise reduction method as presented in Diethorn, E. J., "A Subband Noise-Reduction Method for Enhancing Speech in Telephony & Teleconferencing," *IEEE Workshop on Applications of Signal Processing to Audio and Acoustics*, Mohonk, USA, 1997, the teachings of which are incorporated herein by reference.

Conclusions

First- and second-order ADMAs which are able to adaptively track and attenuate a possibly moving noise source located in the back half plane of the arrays have been presented. It has been shown that, by performing the calculations in subbands, even multiple spatially distinct noise sources with non-overlapping spectra can be tracked and attenuated simultaneously. The real-time implementation presents the dynamic performance of the ADMAs in real acoustic environments and shows the practicability of using these arrays as acoustic front-ends for a variety of applications including telephony, automatic speech recognition, and teleconferencing.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A second-order adaptive differential microphone array (ADMA), comprising:

(a) a first first-order element configured to convert a received audio signal into a first electrical signal;

(b) a second first-order element configured to convert the received audio signal into a second electrical signal;

(c) a first delay node configured to delay the first electrical signal from the first first-order element to generate a delayed first electrical signal;

(d) a second delay node configured to delay the second electrical signal from the second first-order element to generate a delayed second electrical signal;

(e) a first subtraction node configured to generate a forward-facing cardioid signal based on a difference between the first electrical signal and the delayed second electrical signal;

(f) a second subtraction node configured to generate a backward-facing cardioid signal based on a difference between the second electrical signal and the delayed first electrical signal;

(g) an amplifier configured to amplify the backward-facing cardioid signal by a gain parameter to generate an amplified backward-facing cardioid signal; and (h) a third subtraction node configured to generate a difference signal for the second-order ADMA based on a difference between the forward-facing cardioid signal and the amplified backward-facing cardioid signal.

2. The invention of claim 1, further comprising a lowpass filter configured to filter the difference signal from the third subtraction node to generate an output signal for the second-order ADMA.

3. The invention of claim 1, wherein the first and second first-order elements are two dipole elements.

4. The invention of claim 1, wherein each of the first and second first-order elements is a first-order differential microphone array.

5. The invention of claim 4, wherein each first-order differential microphone array comprises:

(1) a first omnidirectional element configured to convert the received audio signal into an electrical signal;

(2) a second omnidirectional element configured to convert the received audio signal into an electrical signal;

(3) a delay node configured to delay the electrical signal from the second omnidirectional element to generate a delayed electrical signal; and (4) a first subtraction node configured to generate the corresponding electrical signal for the first-order element based on a difference between the electrical signal from the first omnidirectional element and the delayed electrical signal from the delay node.

6. The invention of claim 1, wherein the gain parameter for the amplifier is configured to be adaptively adjusted to move a null located in a back half plane of the second-order ADMA to track a moving noise source.

7. The invention of claim 6, wherein the gain parameter is configured to be adaptively adjusted to minimize output power from the second-order ADMA.

8. The invention of claim 1, further comprising:

(i) a first analysis filter bank configured to divide the first electrical signal from the first first-order element into two or more subband electrical signals corresponding to two or more different frequency subbands;

(j) a second analysis filter bank configured to divide the second electrical signal from the second first-order element into two or more subband electrical signals corresponding to the two or more different frequency subbands; and (k) a synthesis filter bank configured to combine two or more different subband difference signals generated by the third difference node to form a fullband difference signal.

9. The invention of claim 8, wherein the amplifier is configured to apply a different subband gain parameter to a backward-facing subband cardioid signal generated by the second subtraction node for each different frequency subband.

10. The invention of claim 9, wherein each different subband gain parameter is configured to be adaptively adjusted to move a different null in a back half plane of the second-order ADMA to track a different moving noise source corresponding to each different frequency subband.

11. The invention of claim 10, wherein each different subband gain parameter is configured to be adaptively adjusted to minimize output power from the second-order ADMA in the corresponding frequency subband.

12. An apparatus for processing signals generated by a microphone array (ADMA) having (i) a first first-order element configured to convert a received audio signal into a first electrical signal and (ii) a second first-order element configured to convert the received audio signal into a second electrical signal, the apparatus comprising:

(a) a first delay node configured to delay the first electrical signal from the first first-order element to generate a delayed first electrical signal;

(b) a second delay node configured to delay the second electrical signal from the second first-order element to generate a delayed second electrical signal;

(c) a first subtraction node configured to generate a forward-facing cardioid signal based on a difference between the first electrical signal and the delayed second electrical signal;

(d) a second subtraction node configured to generate a backward-facing cardioid signal based on a difference between the second electrical signal and the delayed first electrical signal;

(e) an amplifier configured to amplify the backward-facing cardioid signal by a gain parameter to generate an amplified backward-facing cardioid signal; and (f) a third subtraction node configured to generate a difference signal for the second-order ADMA based on a difference between the forward-facing cardioid signal and the amplified backward-facing cardioid signal.

13. The invention of claim 12, further comprising a lowpass filter configured to filter the difference signal from the third subtraction node to generate an output signal for the second-order ADMA.

14. The invention of claim 12, wherein the first and second first-order elements are two dipole elements.

15. The invention of claim 12, wherein each of the first and second first-order elements is a first-order differential microphone array.

16. The invention of claim 15, wherein each first-order differential microphone array comprises:

(1) a first omnidirectional element configured to convert the received audio signal into an electrical signal;

(2) a second omnidirectional element configured to convert the received audio signal into an electrical signal;

(3) a delay node configured to delay the electrical signal from the second omnidirectional element to generate a delayed electrical signal; and (4) a first subtraction node configured to generate the corresponding electrical signal for the first-order element based on a difference between the electrical signal from the first omnidirectional element and the delayed electrical signal from the delay node.

17. The invention of claim 12, wherein the gain parameter for the amplifier is configured to be adaptively adjusted to move a null located in a back half plane of the second-order ADMA to track a moving noise source.

18. The invention of claim 17, wherein the gain parameter is configured to be adaptively adjusted to minimize output power from the second-order ADMA.

19. The invention of claim 12, further comprising:

(g) a first analysis filter bank configured to divide the first electrical signal from the first first-order element into two or more subband electrical signals corresponding to two or more different frequency subbands;

(h) a second analysis filter bank configured to divide the second electrical signal from the second first-order element into two or more subband electrical signals corresponding to the two or more different frequency subbands; and (i) a synthesis filter bank configured to combine two or more different subband difference signals generated by the third difference node to form a fullband difference signal.

20. The invention of claim 19, wherein the amplifier is configured to apply a different subband gain parameter to a backward-facing subband cardioid signal generated by the second subtraction node for each different frequency subband.

21. The invention of claim 20, wherein each different subband gain parameter is configured to be adaptively adjusted to move a different null in a back half plane of the second-order ADMA to track a different moving noise source corresponding to each different frequency subband.

22. The invention of claim 21, wherein each different subband gain parameter is configured to be adaptively adjusted to minimize output power from the second-order ADMA in the corresponding frequency subband.

* * * * *